UNITED STATES PATENT OFFICE.

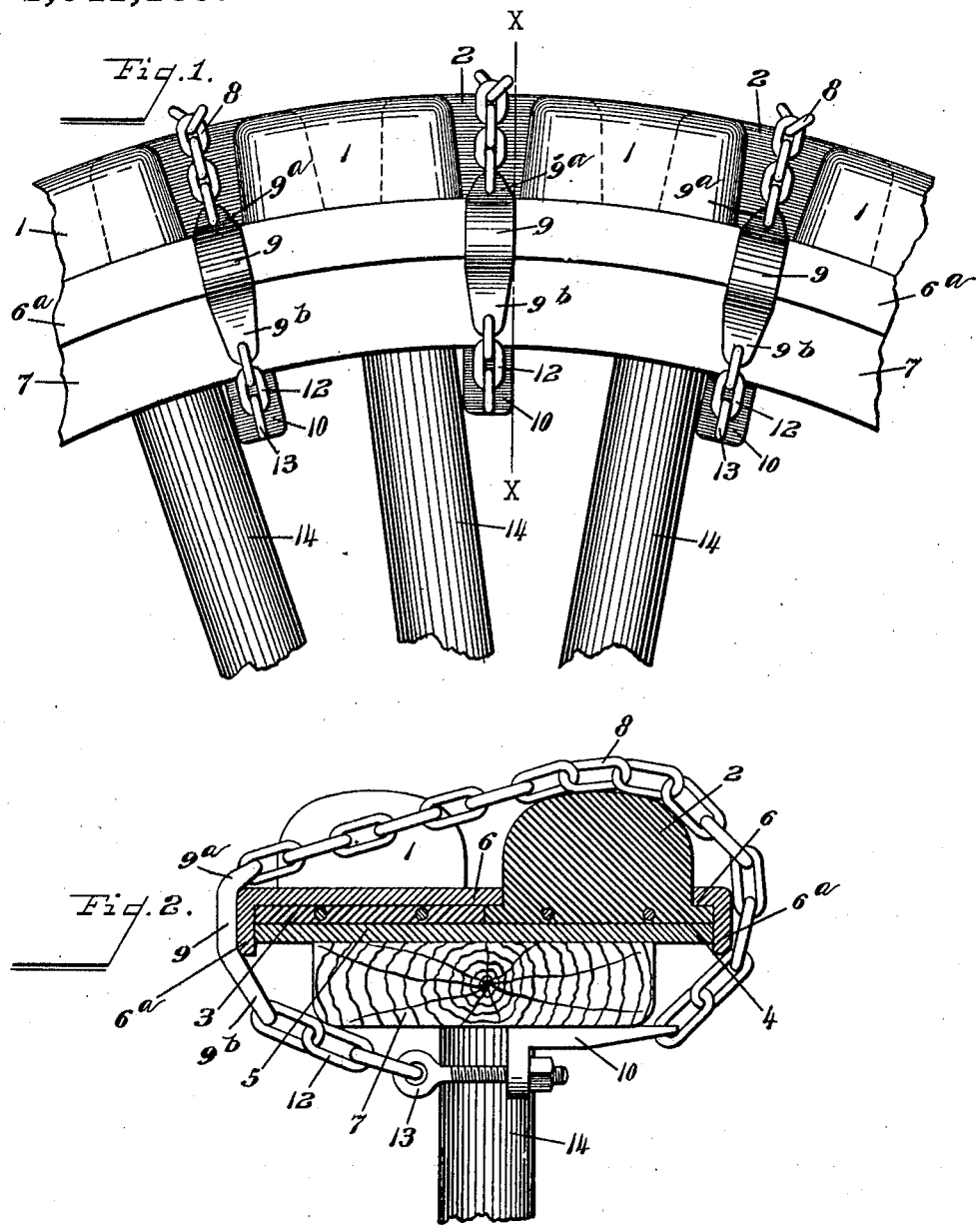

STEPHEN S. MILLER, OF AKRON, OHIO, ASSIGNOR TO CONSOLIDATED RUBBER TIRE COMPANY, OF NEW YORK, N. Y., A CORPORATION OF NEW JERSEY.

ANTISKID DEVICE FOR BLOCK-TIRES.

1,041,139.  Specification of Letters Patent.  Patented Oct. 15, 1912.

Application filed September 15, 1910. Serial No. 582,235.

*To all whom it may concern:*

Be it known that I, STEPHEN S. MILLER, a citizen of the United States, residing at Akron, in the county of Summit and State of Ohio, have invented certain new and useful Improvements in Antiskid Devices for Block-Tires, of which the following is a specification.

My invention relates to improvements in devices for preventing the slipping and skidding of tires for vehicle wheels, and it more particularly relates to a device of this kind intended particularly for solid rubber tires of the sectional type.

One of the objects of the invention is to provide a device of the character referred to which is composed of a series of separate elements each independent of the other, and to further provide means for holding these devices in position which will dispense with the usual cable or chain employed for the purpose extending around the periphery of the tire and connecting all the devices together.

A further object of the invention is to provide a device which will occupy a minimum amount of space at the side of the tire and its channel.

A further object is to provide a device of the character referred to which may be easily adjusted to different sized tires.

A further object is to provide a device which will be simple and cheap in construction and easily applied.

The invention consists in the constructions and combinations of parts hereinafter described and set forth in the claims.

In the drawings—Figure 1 is a side elevation of a portion of a vehicle wheel and its rubber tire and channel with my invention shown applied thereto. Fig. 2 is section on the line $x$—$x$ of Fig. 1.

Like parts are represented by similar characters of reference in the several views.

The tire which is shown in the drawings is a special type of solid rubber tire known as a sectional or block rubber tire, which consists of blocks, 1 and 2, of solid rubber spaced apart and molded integrally with bases 3 and 4. The rubber tires thus formed are placed side by side on the metallic rim 5 so that the blocks 1 will be in staggered rows across, as shown in Fig. 1, and are secured to said rim 5 by the metallic strip 6 which has perforations to receive the respective rubber blocks; said rim 5 being secured to the felly 7 of the vehicle wheel.

A series of independent anti skid and slipping devices are employed, each consisting of a chain 8 connected at one end to the bent-in end 9$^a$ of a strap 9 and at the other end to an angularly shaped metallic plate 10. The central or main portion of the strap 9 is fitted to one of the down-turned flanges 6$^a$ of the strip 6 and has a lower inwardly-inclined portion 9$^b$ which is connected to the plate 10 by the short chain 12 and eye bolt 13. The chain 8 extends between the respective blocks 1 and over the blocks 2 so that the movement of the chain in either direction would be limited by the space between the respective blocks 1. Further it will be seen that the plate 10 and eye bolt 13 lie close against spoke 14 so that the device is further held in proper position.

By removing one or more of the links of the chain or adding thereto it will be seen that the device may be also adjusted to different sized tires.

Another advantage in the device is in the use of the strap 9 which lies close to the securing strip 6; this construction being particularly applicable when the devices are used on motor vehicles which employ chain drives, as in most instances the driving chains run so close to the felly of the vehicle wheel that sufficient room is not provided for links of an anti-skid chain between the drive chain and the wheel channel. By my construction it will be seen that by the use of the strap 9, fitting close to the side of the tire, this difficulty is obviated.

Having thus described my invention, I claim:

1. In a device of the character described, the combination with a rubber tire and its holding device, of a chain extending over the tire, a strap to which one end of said chain is connected, said strap being fitted to one side of the holding device, of an adjusting device to which the other end of said chain is connected, and a flexible connection between said adjusting device and said strap, substantially as specified.

2. In a device of the character described, the combination with a rubber tire and its holding device, and a chain extending over said tire, a strap to which one end of said chain is connected fitted to the one side of the holding device, a plate having a connection to the other end of said chain, an eye-bolt adjustably connected with said plate, and a flexible connection between said eye-bolt and said strap, substantially as specified.

In testimony whereof, I have hereunto set my hand this 3rd day of September 1910.

STEPHEN S. MILLER.

Witnesses:
 STELLA ALLEN,
 FRANCIS SEIBERLING.